Dec. 4, 1928.
E. S. EVANS
1,694,316
COMPOSITION CHOCK BLOCK
Filed April 18, 1927
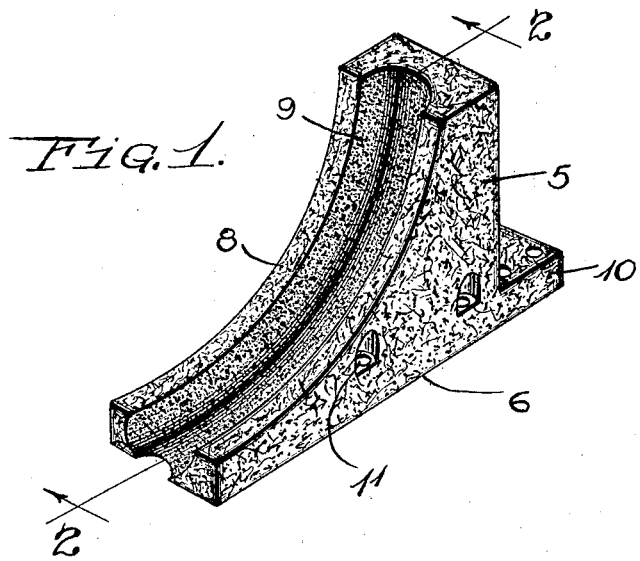
Fig.1.
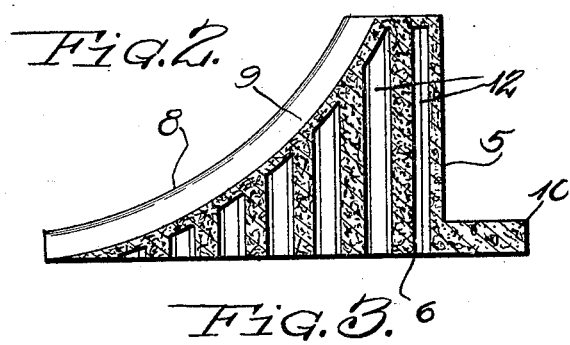
Fig.2.
Fig.3.
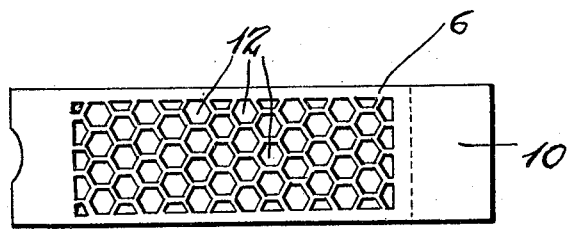
INVENTOR.
E. S. Evans
BY
ATTORNEY.

Patented Dec. 4, 1928.

1,694,316

UNITED STATES PATENT OFFICE.

EDWARD S. EVANS, OF DETROIT, MICHIGAN, ASSIGNOR TO THE EVANS AUTO LOADING CO. INC., OF DETROIT, MICHIGAN, A CORPORATION OF DELAWARE.

COMPOSITION CHOCK BLOCK.

Application filed April 18, 1927. Serial No. 184,709.

This invention relates to improvements in chock blocks for chocking vehicle wheels, and is especially designed for use in the shipping of automobiles.

More particularly, the invention has reference to an improved form of composition chock block molded from plastic material and having a curved bearing face to fit against and partly around the tire of the wheel.

The present invention consists in forming a composition chock block hollow with crossed partitions therein which strengthens the outside of the block and by which means it can be made extremely light, cheaply and rapidly, and be at the same time of sufficient strength.

Other objects will appear as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a perspective view of a composition chock block constructed in accordance with the present invention;

Figure 2 is a substantially central longitudinal sectional view thereof taken on line 2—2 of Figure 1; and Figure 3 is a bottom plan view of the chock block shown in Figures 1 and 2.

Referring more in detail to the drawing, the present chock block consists of a suitably molded body 5 having a flat base 6, and a curved front tire bearing surface 8 which is preferably grooved as at 9 centrally and longitudinally to fit against and partly around the tire in a well known manner. If desired, the chock block may have an integral heel extension 10 of any desired form to facilitate fastening of the block to the floor of the car, and side notches may be formed in the block as at 11 for the same purpose. The sides and the rear surface of the block above the heel 10 are preferably vertical as shown.

It has been heretofore proposed to mold chock blocks from Portland cement or the like, but they have been objectionable heretofore because of excessive weight or insufficient strength when hollowed out improperly or in an impractical manner. While the present invention contemplates embracing formation of the present chock blocks out of Portland cement, and other plastic materials having similar characteristics, it is nevertheless preferred to mold the same out of a lighter plastic material capable of being highly compressed to have a texture which is quite dense whereby the block is characterized as having great tensile strength. A composition suitable for this purpose consists in asphalt and finely divided cinders or sawdust mixed and suitably rendered plastic by the addition of a sufficient quantity of water. When the block is so formed it is devoid of the brittleness of blocks made from Portland cement, the latter cracking and chipping to an excessive degree under the ordinary severe usages to which they are subjected in practice. However, as stated above, it is only essential that the plastic material be capable of being molded or cast while in a plastic or fluid state, at the same time having the property of hardening to a sufficient strength suitable for the purpose.

The present chock block can be molded in any suitable mold and by any machinery now in use so long as the mold is given the necessary shape and provided with the necessary form and number of posts or core elements suitably mounted at the required positions to form the holes 12 which extend vertically of the block through the base 6 and to a point adjacent to but below the upper surface and curved bearing surface of the block as shown in Figure 3. Thus, the holes 12 are pierced from the bottom and may be of any desired shape, but the form which I deem most desirable is hexagonal. Moreover, I prefer to so relate the cores as to produce intervening walls 13 between the holes of uniform thickness with the holes or sockets staggered in honey comb fashion as shown in Figure 3. The holes may be larger or smaller in proportion to the thickness of the partitions, but for economy they should remove at least one half of the material of a solid block. The portion which closes the upper ends of the holes will add considerable strength and avoid objectionable piercing of the bearing surface.

Chock blocks made in accordance with the above will obviously be found more light to handle than composition blocks heretofore proposed, although possessing considerably more strength without the use of internal metal reinforcements.

From the foregoing description it is believed that the construction as well as the advantages of the present invention will be readily understood and appreciated by those skilled in the art.

What I claim as new is:—

A molded composition chock block formed with a curved bearing face and having therein a plurality of vertical holes separated by partitions and extending upwardly from the lower face of the block, said holes being of gradually increasing height from one end of the block to the other end and terminating in an arcuate line concentric with the curved bearing face of the block.

In testimony whereof I affix my signature.

EDWARD S. EVANS.